United States Patent

[11] 3,608,046

[72] Inventors Albert R. Philips;
Richard F. Hellbaum, both of Hampton, Va.
[21] Appl. No. 763,684
[22] Filed Sept. 30, 1968
[45] Patented Sept. 21, 1971
[73] Assignee The United States of America as represented by the Administrator of the National Aeronautics and Space Administration

[54] TECHNIQUE OF DUPLICATING FRAGILE CORE
3 Claims, 12 Drawing Figs.
[52] U.S. Cl. .................................................. 264/221,
264/225, 264/227, 264/DIG. 44
[51] Int. Cl. ..................................................... B29c 1/02,
B29c 1/06, B29c 1/08
[50] Field of Search .......................................... 264/220,
221, 227, 225

[56] References Cited
UNITED STATES PATENTS
3,217,067 11/1965 Tencate.......................... 264/227
3,472,306 10/1969 Austin............................ 264/227
3,459,847 8/1969 Steptoe .......................... 264/220
2,777,166 1/1957 Morin............................. 264/219
3,364,090 1/1968 Slipp .............................. 264/220

Primary Examiner—Robert F. White
Assistant Examiner—Jeffrey R. Thurlow
Attorneys—Howard J. Osborn, Wallace J. Nelson and G. T. McCoy ABSTRACT: A method of fabricating individual and complete fluid circuit components by the construction of temporary one-shot disposable dies which are used to produce the fragile core or pattern.

INVENTORS
ALBERT R. PHILIPS
RICHARD F. HELLBAUM
BY
ATTORNEYS

TECHNIQUE OF DUPLICATING FRAGILE CORE

The invention described herein was made by employees of the United States Government and may be manufactured and used by or for the Government for governmental purposes without the payment of any royalties thereon or therefor.

This invention relates to a method of fabricating minute fluid state control circuit components and complete fluid circuits. The method utilizes disposable molds to form a core around which is cast an epoxy thus producing the desired component or circuit upon removal of the core.

Fluid circuits are utilized in the technology of sensing, computation, and control using fluids without the aid of moving mechanical parts. This relatively new, but rapidly expanding, technology is termed "Fluerics" or "Fluidics" and is becoming increasingly important, particularly in space systems and the like where there is a need to minimize the use of moving parts in the instrumentation employed. Although fluidics is not confined to small instrumentation, the present invention has been developed for miniaturized circuits. Obviously, this invention would also be equally applicable to the making of large circuits and individual components therefor.

The present digital fluidic devices are being used almost exclusively because of the difficulties in analyzing fluidic analog circuits but progress is being made along these lines. Some of the present and anticipated uses of fluidics for the government include flight control systems, turbojet controls, arming, safing and fuzing, temperature measurement and control, diverter valves, yaw dampers, boiler combustion control, biomedical applications, and the like. A number of these uses require miniaturized instrumentation and difficulties have been encountered in fabricating circuits and circuit components that are reliable and that can be readily duplicated.

Accordingly, it is an object of the present invention to provide a novel process for duplicating miniature fluid circuit components.

Another object of the present invention is to provide a novel method of fabricating fluidic circuits.

Another object of the present invention is to provide a method of fabricating individual fluidic circuit components.

A further object of the present invention is to provide a method of duplicating fragile core or pattern configuration by the construction of temporary one-shot disposable molds.

The foregoing and other objects are attainable in one application of the present invention by photoreducing a large-scale drawing of the circuit component desired, making a three-dimensional photosensitive plastic master pattern from the photonegative and utilizing this pattern to cast a disposable mold, forming a pattern wax or low melting metal alloy core from the disposable mold and utilizing this core to form the desired configuration in an epoxy resin casting. This core is then removed from the resin configuration leaving a unitary circuit component.

For fabrication of multilayer circuits disposable molds complete with internal connections are stacked together prior to injection of the core material. A more complete appreciation of the invention and many of the attendant advantages thereof will be readily apparent as the same becomes better understood by reference to the following more detailed description when considered in connection with the accompanying drawings wherein.

Figure 1:
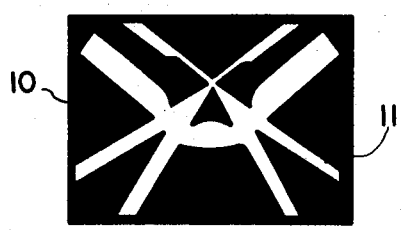
FIG. 1 is a view of a photographic transparency of a specific circuit component reduced to its actual size and taken from an enlarged detailed drawing of the specific circuit component.
Figure 4:
FIG. 4 is a sectional view of the soluble mold of FIG. 3 taken along lines 4—4 of FIG. 3.
Figure 5:
FIG. 5 is a view similar to FIG. 4 and showing a flat plate positioned on the wax mold to clearly define the channels or pattern formed in the mold.
Figure 9:
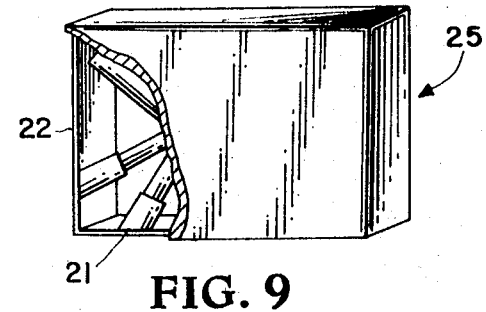
FIG. 9 shows the male core of FIG. 7 placed in a mold core box for casting an epoxy resin therein.
Figure 10:
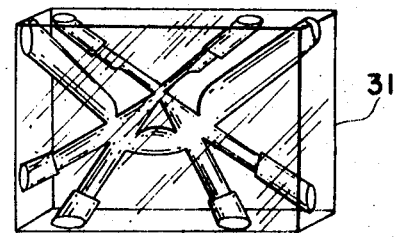
Figure 11:
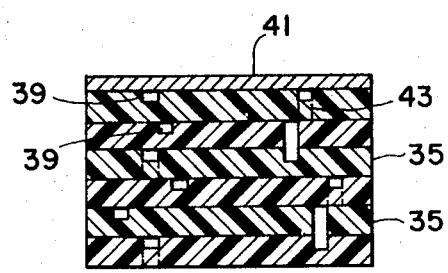

FIG. 10 illustrates the final circuit component obtained after curing the cast epoxy from FIG. 9 and melting and washing away the male core used to define the component channels; and FIG. 11 shows how a complete fluidic circuit may be formed by stacking individual soluble molds similar to that shown in FIG. 4 and providing selected holes therein to form continuous fluid passageways in the final form. Referring now more particularly to the drawings, wherein like reference numerals designate identical or corresponding parts throughout the several views, and more particularly to FIG. 1, there is shown a photographic negative 10 of a specific fluid circuit component 11. Negative 10 is made from an enlarged detailed sketch or drawing of the specific circuit component that is desired to be reproduced and reduced to actual component size by conventional photographic techniques.

Figure 2:
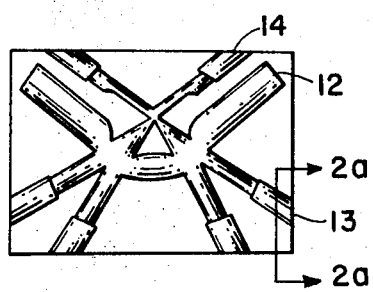
FIG. 2 is a view of a three-dimensional pattern of the circuit component shown in the photographic reproduction of FIG. 1 and formed by a printing process used to convert two-dimensional negatives into three-dimensional plastic patterns.

A male pattern 12 of the circuit component 11 is printed by the conventional Dycril or Templex printing processes (FIG. 2). Dycril and Templex are trade names of the du Pont Company for a printing process used to convert two-dimensional negatives to three-dimensional patterns in light-sensitive plastics, also referred to as Dycril and Templex. Complete details of these processes are well known to those skilled in the art and are further explained in Industrial Bulletins Nos. 1, 2 and 5 dated Apr., May and June 1965, respectively, and issued by the du Pont Photo Products Department of the E. I. du Pont De Nemours & Co., Inc., Wilmington, Del.

Figure 6:
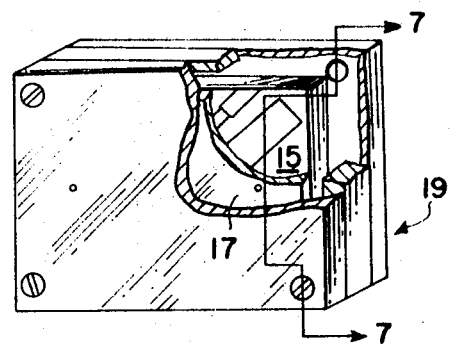
FIG. 6 illustrates the cavity of the soluble mold retaining vessel used for holding the assembly of FIG. 5 during injection of the disposable mold with a core material.
Figure 2A:
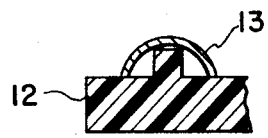
FIG. 2a is a section taken along line 2a—2a of FIG. 2.
Figure 7:
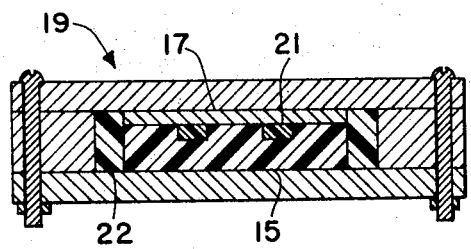
FIG. 7 is a detailed sectional view of the retaining vessel taken along lines 7—7 of FIG. 6.

After printing, selected ends of the three-dimensional pattern 12 are covered with short sections of half tubular plastic or metal sleeves, two of which are designated by reference numerals 13 and 14 (FIGS. 2 and 2a). These half-sleeves 13 and 14 and the others, not designated, serve to provide enlarged ends for the finally formed circuit component to aid in connecting adjacent components in a complete circuit. A water-acid soluble wax, is injected or pressure-cast around male pattern 12 and the half-sleeves to produce a soluble female mold 15 of circuit pattern 11 formed of the wax. The male pattern 12 is easily physically separated from the female wax mold 15 in a conventional manner. A flat plate 17 of aluminum or the like is then placed over the face of mold 15 to close the open side of pattern 11 and the spacing formed between plate 17 and mold 15 injected with a suitable core material (FIGS. 6 and 7).

Suitable half circular holes (not shown) are provided in plate 17 equal in number and size and disposed opposite to the enlarged ends in mold 15 formed by the half tubular sleeves utilized in the preceding step.

This step is accomplished by clamping plate 17 and mold 15 together in a conventional manner and placing the clamped structure evacuated a soluble mold retaining vessel generally designated by reference numeral 19 (FIGS. 6 and 7) which is then positioned within a small high-pressure chamber (not shown). An example of suitable core materials which may be used for this step is the conventional insoluble pattern waxes which have a melting point in the range of 155–165° F. The selected core wax is pressure-cast into the spacing between mold 15 and plate 17 at approximately 400 p.s.i.a. after the chamber has been evacuated to 0.02 p.s.i.a.

Figure 8:
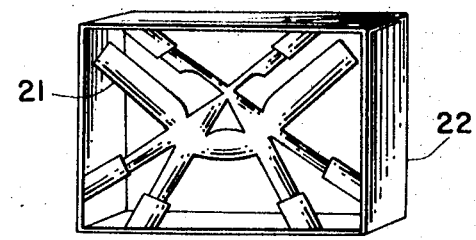
FIG. 8 illustrates the male core housed in its integrally formed support frame obtained after washing away the soluble mold of FIG. 3.

Mold 15 may then be dissolved by dipping in 10 percent hydrochloric acid until only the unitary male core 21 of the circuit component remains within a unitary frame 20 formed of the core wax (FIG. 8). Core 21 is then washed with water, dried by a flow of warm air and positioned within a suitable mold 25 for casting epoxy resin thereabout (FIG. 9). Mold 25 for casting the epoxy resin is provided with internal dimensions conforming to the final exterior dimensions desired for the particular circuit component. A suitable patting composition, epoxy resin room temperature curing 6–8 percent by weight of activator "A," is then invested around pattern 21 and frame 22 and allowed to cure or harden for 12 hours at room temperature. After curing the epoxy resin form is removed from mold 25 with core 21 and frame 22 being melted out in kerosene at 212° F. until all the core and frame are removed, to leave a complete and unitary circuit component 31 having the desired circuit pattern formed therein (FIG. 10).

ALTERNATE EMBODIMENTS

Figure 3:
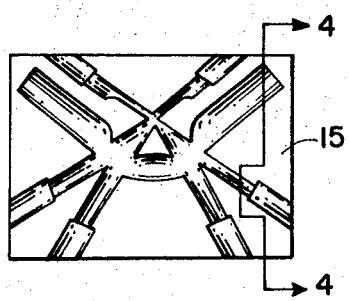
FIG. 3 is a view of a soluble female mold made from the pattern of FIG. 2.

Referring now more particularly to FIG. 11, an alternate embodiment of the present invention will now be described. In this Figure, a plurality of wax female molds 35, similar to that described hereinbefore in reference to FIGS. 3 and 4, are disposed in stacked relationship with a flat plate 41 of aluminum or soluble wax covering the uppermost mold 35. Each of molds 35 is provided with a suitable fluid channel pattern 39 therein corresponding to a specific component for a complete, or segment of a, fluid circuit. Suitable selected bores or holes 43 are provided in each mold 35 to provide for interconnection with the adjacent mold. A flat plate 41 formed of aluminum or soluble wax serves as an end closure for the stack of molds 35 and the entire stack is then clamped together and placed in a high pressure chamber for injection of channels 39 and bores 41 with a suitable pattern wax core material. The time, pressure, temperature, etc., for this procedure are as in the previously described embodiment. The injected assembly is then removed from the pressure chamber, plate 41 removed and molds 35 dissolved in weak hydrochloric acid, as described hereinbefore, leaving a core pattern of channels 39 and connecting holes 43. This core is then invested with an epoxy resin, the resin cured and the core melted and removed to leave a unitary epoxy resin fluid circuit or segment of a complete circuit.

There are obviously many modifications and variations of the invention described herein readily apparent to those skilled in the art. For example, in lieu of the photographic process to obtain the pattern formed in FIGS. 2 and 3 it is also obviously possible to machine these patterns directly into the mold 15. Also it is readily apparent that a suitable low-melting alloy, which is insoluble in the weak hydrochloric acid, may be employed in lieu of the pattern wax used to make the cores. Also, other low-melting point metals and waxes other than that employed in the specific examples described are equally applicable to the present disclosure. Thus, where specific materials are described they are intended as illustrative only and not essential to the invention. Additionally, the enlarged ends for the individual channels may be bored in the final epoxy configuration instead of being provided as described hereinbefore.

It is therefore to be understood that within the scope of the appended claims the invention may be practiced otherwise than as specifically described.

What is claimed and desired to be secured by Letters Patent of the United States is:

1. A method of duplicating individual minute fluid circuit components for use in fluid circuits comprising:
   1. employing a master male pattern of the circuit component to be duplicated,
   2. pressure casting a water-acid soluble wax around said master male pattern to pick up the circuit configuration in a disposable female mold formed of the soluble wax,
   3. physically separating the soluble wax female mold from the master male pattern,
   4. covering the face of the female mold with a rigid flat plate of a material selected from the group consisting of aluminum and soluble waxes,
   5. filling the cavities formed between said rigid plate and said female mold with a material selected from the group consisting of low melting point metals and pattern waxes by pressure casting to form a rigid core,
   6. dissolving said water-acid soluble wax from said core by immersing the pressure cast wax in a weak acid solution,
   7. investing the remaining male core form with an epoxy resin to encase the male core, and
   8. melting said encased core from said epoxy resin to recover a unitary epoxy block having channels formed therethrough to serve as a minute unitary fluidic circuit component.
2. A method of duplicating individual minute fluid circuit components for use in fluid circuits comprising:
   1. making a photographic transparency of the actual size of a specific circuit component having a plurality of end portions from an enlarged detailed drawing the circuit component desired,
   2. employing a photosensitive plastic to print a three-dimensional male pattern of the circuit form from the two-dimensional photographic transparency,
   3. covering each end portion of said male pattern with short sections of half-tubular sleeves to thereby provide enlarged ends for the finally formed circuit component,
   4. pressure casting a water-acid soluble wax around said master male pattern to pick up the circuit configuration in a disposable female mold,
   5. physically separating the soluble wax female mold from the male pattern,
   6. covering the face of the female mold with a rigid flat plate of a material selected from the group consisting of aluminum and soluble waxes,
   7. filling the cavities formed between said frigid plate and said female mold with a meltable insoluble metal core material by pressure casting,
   8. immersing the filled pressure cast wax form in a weak acid solution to dissolve said water-acid soluble wax from said metal core,
   9. investing the remaining male metal core with an epoxy resin to encase the male core, and
   10. melting and washing said core from said epoxy resin to leave a unitary circuit component.
3. A method of fabricating a unitary complete fluid circuit comprising:
   1. making a plurality of three-dimensional patterns of individual male molds of each individual circuit component of a complete circuit in a plurality of sheets,
   2. securing a flat plate spaced from each three-dimensional pattern and injecting the spacing between the plate and pattern with a soluble wax to produce a wax female mold of the individual circuit components,
   3. providing selected holes through each soluble wax mold to permit appropriate interconnections between the channel of one mold and the channel in another mold,
   4. physically separating each female mold from each male pattern,
   5. stacking the wax female molds in proper face-to-face sequence to form a complete circuit core mold,
   6. securing a flat plate of a material selected from aluminum and soluble waxes to cover the face of the uppermost female mold,
   7. securing the circuit core mold in a small high pressure chamber and pressure injecting an insoluble meltable wax into this chamber so as to completely fill all of the channels and holes in each soluble wax mold, and those formed between the uppermost mold and its flat cover plate,
   8. physically removing the injected structure from the high pressure chamber, 9. dissolving the soluble wax molds so as to leave a fragile three-dimensional interconnected male core pattern of all channels and interconnections required for a complete fluid circuit, 10. casting and curing an epoxy resin encasing the three-dimensional male core pattern, and 11. melting and washing out the insoluble meltable wax pattern so as to recover a complete unitary fluid circuit formed of epoxy resin.